United States Patent
Nalwa

[19]

[11] Patent Number: 6,144,501
[45] Date of Patent: Nov. 7, 2000

[54] SPLIT MIRRORED PANORAMIC IMAGE DISPLAY

[75] Inventor: Vishvjit Singh Nalwa, Middletown, N.J.

[73] Assignee: Lucent Technologies Inc., Murray Hill, N.J.

[21] Appl. No.: 09/143,414

[22] Filed: Aug. 28, 1998

[51] Int. Cl.[7] .................................................. G02B 13/06
[52] U.S. Cl. .......................................................... 359/725
[58] Field of Search .................................. 359/725, 642

[56] References Cited

U.S. PATENT DOCUMENTS

| | | | |
|---|---|---|---|
| 2,267,813 | 12/1941 | Buckner | 250/141 |
| 2,304,434 | 12/1942 | Ayres | 88/24 |
| 3,144,806 | 8/1964 | Smith | 88/16.6 |
| 3,286,590 | 11/1966 | Brueggemann | 88/24 |
| 3,420,605 | 1/1969 | Kipping | 352/69 |
| 3,506,344 | 4/1970 | Petit, Jr. | 352/69 |
| 3,740,469 | 6/1973 | Herndon | 178/6.8 |
| 3,998,532 | 12/1976 | Dykes | 352/69 |
| 4,078,860 | 3/1978 | Globus et al. | 352/69 |
| 4,355,328 | 10/1982 | Kulik | 358/87 |
| 4,357,081 | 11/1982 | Moddemeijer | 352/69 |
| 4,429,957 | 2/1984 | King | 350/423 |
| 4,766,429 | 8/1988 | Stapleton | 345/121 |
| 4,859,046 | 8/1989 | Traynor et al. | 350/627 |
| 4,890,314 | 12/1989 | Judd et al. | 379/53 |
| 4,982,092 | 1/1991 | Johle | 250/332 |
| 4,985,762 | 1/1991 | Smith | 358/87 |
| 5,016,109 | 5/1991 | Gaylord | 358/225 |
| 5,023,725 | 6/1991 | McCutchen | 358/231 |
| 5,030,823 | 7/1991 | Obdeijn | 250/223 |
| 5,040,055 | 8/1991 | Smith | 358/87 |
| 5,130,794 | 7/1992 | Ritchey | 358/87 |
| 5,179,440 | 1/1993 | Loban et al. | 358/87 |
| 5,187,571 | 2/1993 | Bruan et al. | 358/85 |
| 5,194,959 | 3/1993 | Kaneko et al. | 358/225 |
| 5,236,199 | 8/1993 | Thompson, Jr. | 273/439 |
| 5,245,175 | 9/1993 | Inabata | 250/201.8 |
| 5,264,945 | 11/1993 | Kannegundla et al. | 358/444 |
| 5,305,029 | 4/1994 | Yoshida et al. | 353/37 |
| 5,452,135 | 9/1995 | Maki et al. | 359/834 |
| 5,495,576 | 2/1996 | Ritchey | 395/125 |
| 5,526,133 | 6/1996 | Paff | 358/335 |
| 5,539,483 | 7/1996 | Nalwa | 353/94 |
| 5,619,255 | 4/1997 | Booth | 348/36 |
| 5,684,626 | 11/1997 | Greenberg | 359/388 |
| 5,708,469 | 1/1998 | Herzberg | 348/39 |
| 5,745,305 | 4/1998 | Nalwa | 359/725 |

FOREIGN PATENT DOCUMENTS

| | | |
|---|---|---|
| 0 484 801 A3 | 5/1992 | European Pat. Off. . |
| 0 519 774 | 12/1992 | European Pat. Off. . |
| 0 793 074 A1 | 9/1997 | European Pat. Off. . |
| 1528819 | 5/1968 | France . |
| 37 39 697 | 12/1988 | Germany . |
| 60-20692 | 2/1985 | Japan . |
| WO 92 14341 | 8/1992 | WIPO . |
| 93 25927 | 12/1993 | WIPO . |
| WO 97/43854 | 11/1997 | WIPO . |

OTHER PUBLICATIONS

IEICE Transaction on Communications, vol. E77–B, No. 2, Feb. 1, 1994, pp. 232–238, XP000447116, Kazutake Uehira et al., "Seamless Image–Connection Technique For A Multiple–Sensor Camera," p. 233, column 1, line 19—p. 234, column 1, line 14.

"Omnidirectional Imaging with Hyperboloidal Projection," by K. Yamazawa, et al, .us 1993 IEEE Intern'l Conference, Yokohama, Japan, Jul. 26–30, 1993, pp. 1029–1034.

Derwent Publication on DE 3930–774–A, "Projector for video colour picture."

"Panoramic Optics Give U.S. Tankers A Better than Birdseye View," by D. Rees and M. Lisic, Industrial Photography, Apr. 1963, pp. 36, 37, and 69.

Starchild: Galaxies, XP002124075, Internet: URL:http://starchild.gsfc.nasa.gov/...w/universe_level1/galaxies.htlm.

*Primary Examiner*—Scott J. Sugarman
*Attorney, Agent, or Firm*—Christopher N. Malvone

[57] ABSTRACT

A panoramic image is displayed as two partial images. A first partial image shows approximately 180 degrees of the panoramic image centered about a viewing direction selected by a user. A second partial image shows approximately the remaining 180 degrees of the panoramic image as a mirror image. As a result, a user more readily understands the relationship between objects in different parts of the panoramic display.

13 Claims, 3 Drawing Sheets

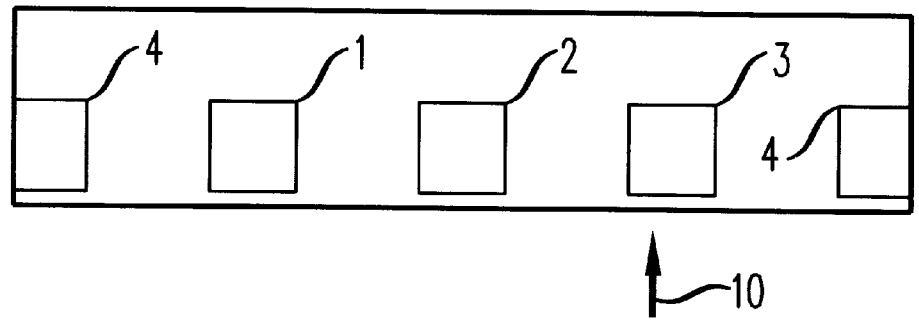
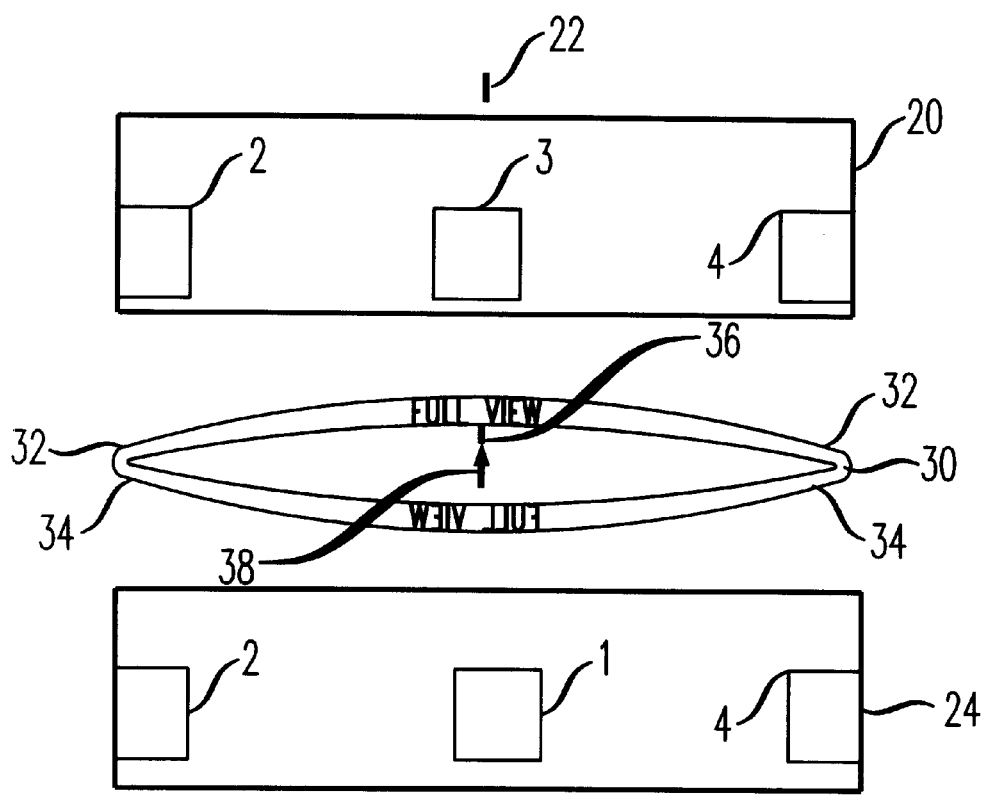

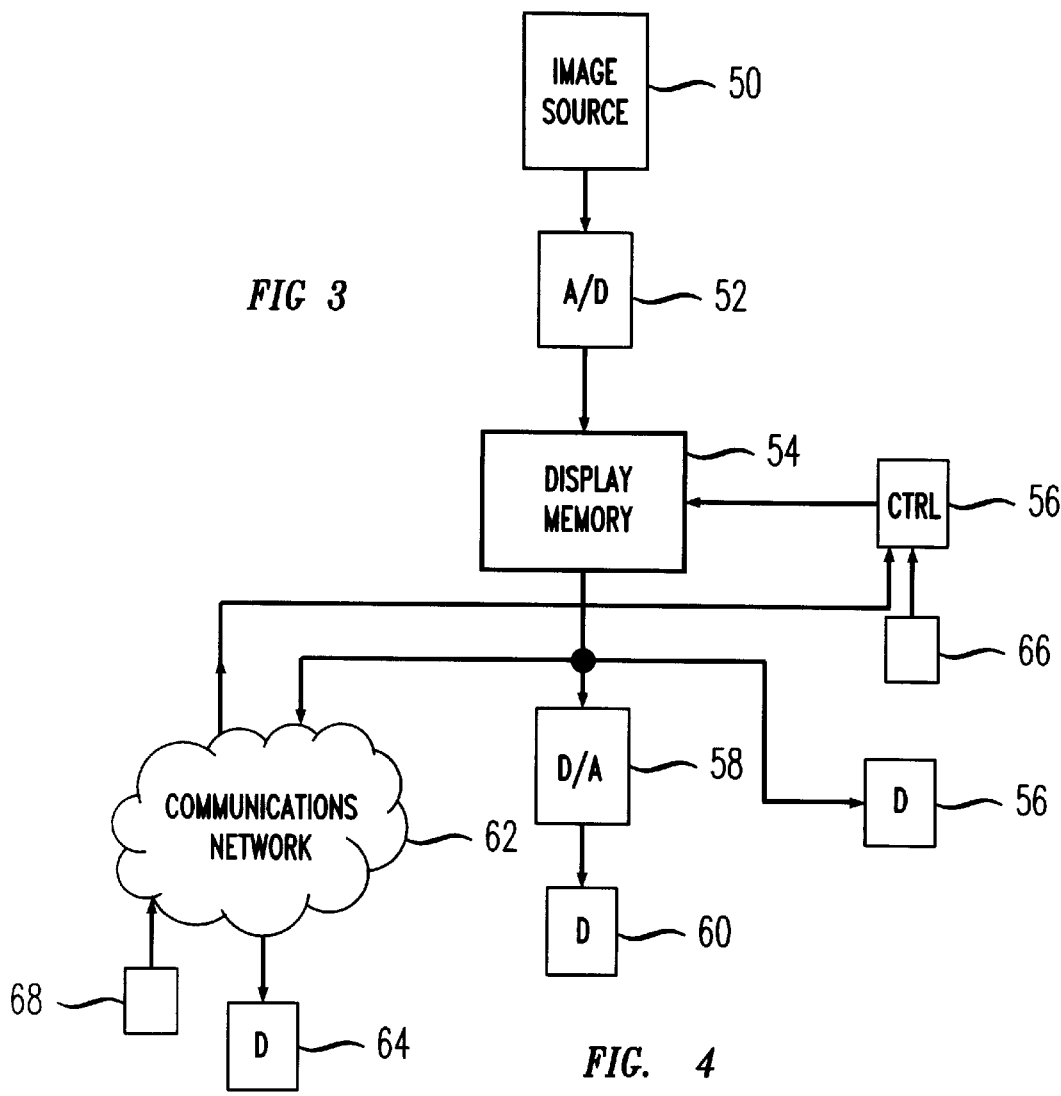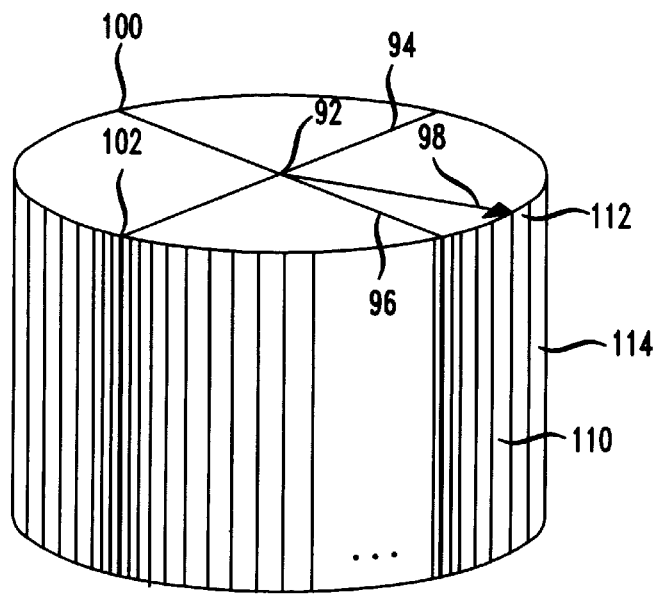

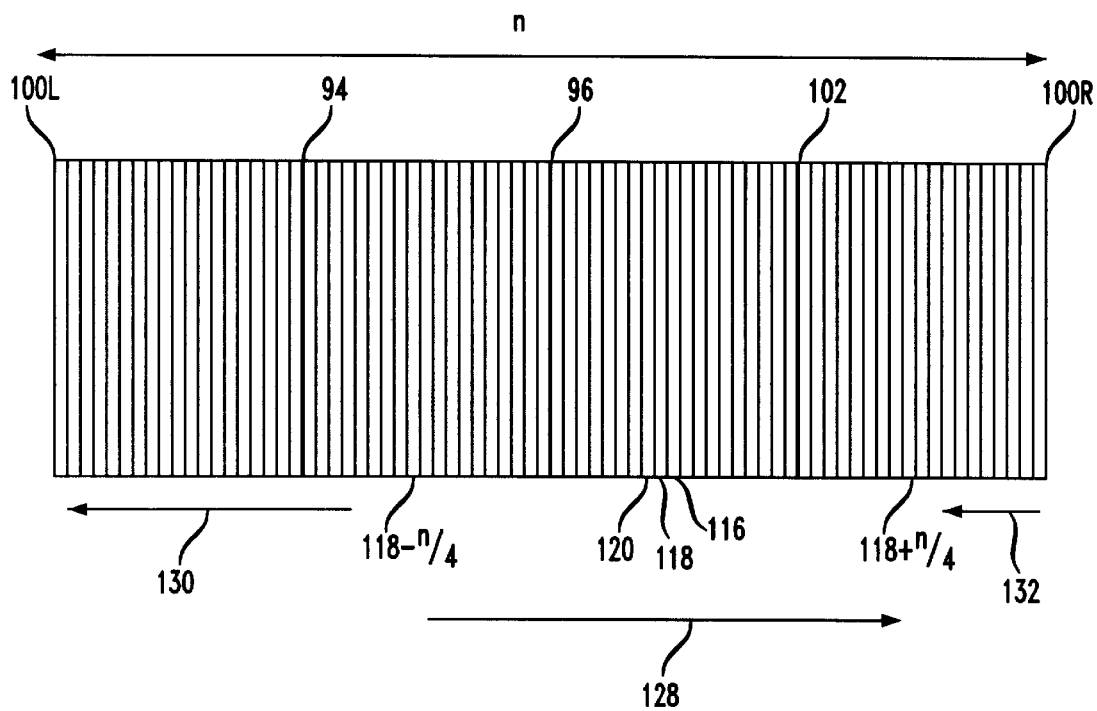
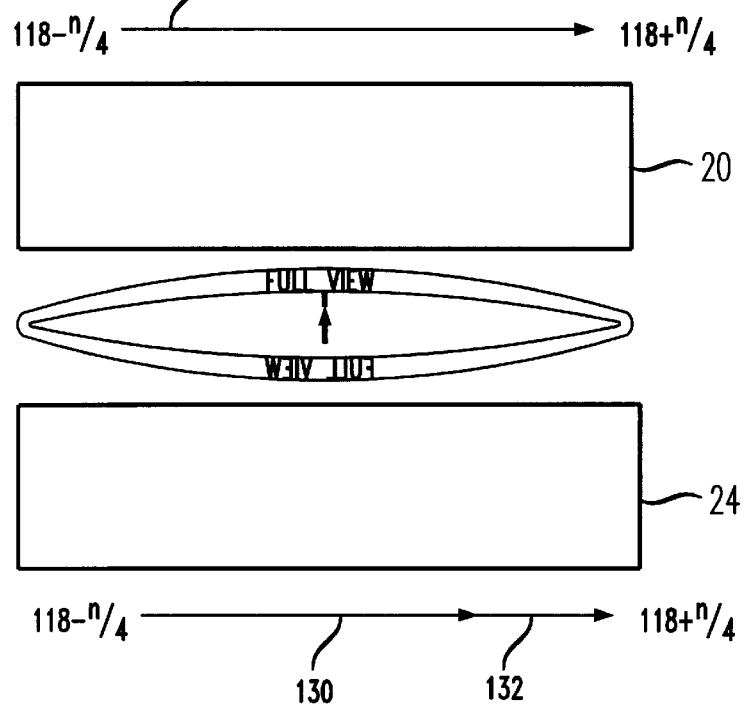

SPLIT MIRRORED PANORAMIC IMAGE DISPLAY

CROSS REFERENCE TO RELATED INVENTION

This application is related to commonly assigned and concurrently filed U.S. Patent Application entitled "Icon referenced Panoramic Image Display."

BACKGROUND OF THE INVENTION

1. Field of the Invention

The present invention relates to displays; more particularly, panoramic displays.

2. Description of the Related Art

In the past, panoramic images were displayed as a single rolled out panoramic display. FIG. 1 illustrates such a display. FIG. 1 can be thought of as a cylindrical panoramic view that is unrolled on a display. Unfortunately, such a display is disorienting to a user. For example, a user who is looking in the direction indicated by arrow 10 does not get a clear understanding of how the view 180 degrees away from arrow 10 appears. As a result, there is a need for a display that more clearly shows panoramic images.

SUMMARY OF THE INVENTION

The present invention solves the aforementioned problems by displaying panoramic images as two partial images. The first partial image shows approximately 180 degrees of the panoramic image centered about a viewing direction selected by a user. The second partial image shows approximately the remaining 180 degrees of the panoramic image as a mirror image. As a result, a user more readily understands the relationship between objects in different parts of the panoramic image.

The present invention also provides an elliptical icon which further helps to orient a user by providing reference points.

BRIEF DESCRIPTION OF THE DRAWINGS

FIG. 1 illustrates a prior art panoramic display;

FIG. 2 illustrates a two-part panoramic display with a substantially elliptical icon;

FIG. 3 illustrates a block diagram of a display system;

FIG. 4 illustrates the relationship between image data and a viewing direction;

FIG. 5 illustrates a memory structure used to store image data; and

FIG. 6 illustrates the relationship between stored image data and the displayed image.

DETAILED DESCRIPTION OF THE INVENTION

FIG. 2 illustrates a two part panoramic display, where the panoramic image is displayed in two display areas. Top display area 20 corresponds to approximately 180 degrees of the total panoramic image, with reference 22 corresponding to the viewing direction selected by a user. Lower display area 24 corresponds to approximately the remaining 180 degrees, that is, the 180 degrees of the panoramic image in a direction opposite to the direction selected by the user. The image in lower area 24 is shown as a mirror image or a reverse image. As a result, it is easier for a user to stay oriented with respect to the panoramic image. For example, if the user looking in the direction indicated by reference 22 sees a portion of object 2 to his or her left, it is easier to comprehend the panoramic view if the remaining portion of object 2 is also on the user's left in the lower image, where the lower image corresponds to the portion of the panoramic view behind the user or opposite to the user's selected viewing direction. It should be noted that the upper and lower display areas may each independently show more or less than 180 degrees of the panoramic image.

Substantially elliptical icon 30 further provides orientation for the user by graphically representing the entire panoramic field of view. Portion 32 of icon 30 is closest to upper display 20 and could indicates what portion of a panoramic view is in front of the user. Portion 34 of elliptical icon 30 is closest to lower display area 24 and could indicate what portion of the panoramic view is behind the user. Alternately, it is possible to include arrow 38 which indicates the direction of view selected by the user. It should be noted that arrow 38 would typically point to the middle of display 20; however, it may point in different directions based on the selected view. To further distinguish between portions of icon 30 representing front and back, left and right, it is possible to use different colors, shades or cross hatching for different portions of the icon.

FIG. 3 illustrates a block diagram of a panoramic viewing system using the display of FIG. 2. Panoramic image source or camera 50 provides panoramic signals representative of a panoramic view to analog to digital converter 52. Analog to digital converter 52 provides data representative of the panoramic view to display memory 54. Display memory 54 stores the image data using addressing provided by controller 56. Controller 56 may be a microprocessor or a microcontroller. When image data is provided to a user for display, addressing is provided by controller 56. Controller 56 provides the read addressing based on the viewing direction selected by a user. It is also possible for a random direction of view to be selected, and for controller 56 to provide read addressing to display memory 54 in order to read out data in accordance with the random viewing direction. If display device 56 has a digital input the panoramic image data read from display memory 54 may be provided to display device 56 directly. Digital to analog converter 58 is used to provide image signals to analog display devices such as display device 60. It is also possible to send the panoramic image data over communication network 62 to a distant display device 64. Since it is possible for a user to select the direction of view, the user input may be provided by, for example, joystick 66 or joystick 68, where joystick 68 provides user input via communication network 62.

FIG. 4 is a cylindrical representation of a panoramic image that illustrates the relationship between the direction of view and image data comprising the panoramic image. The data can be thought of as columns of data representative of pixels that form a cylinder around a central point 92. For example, the columns between reference lines 94 and 96 can be thought of as columns of image data representative of pixels obtained from the direction of arrow 98 with a 45 degree field of view on each side of the arrow.

FIG. 5 illustrates the structure of display memory 54 where the image data discussed with regard to FIG. 4 is stored. For the sake of clarity, reference lines 94, 96, 100L, 100R and 102 are provided to show the relationship between the section of the cylinder in FIG. 4 and the sections of memory in FIG. 5. (100L and 100R can be thought of as the left and right portions of line 100 of FIG. 4, respectively.) The data corresponding to the columns of FIG. 4 is written into the columns of FIG. 5. For example, the data corresponding to columns 110, 112 and 114 of FIG. 4 is written into columns 116, 118 and 120 of FIG. 5, respectively. This process is repeated for all the columns of data from FIG. 4.

Once the data is stored in display memory 54 as illustrated in FIG. 5, controller 56 produces the addressing for reading the data from the memory for display in accordance with a user input. The data corresponding to approximately 90 degrees on either side of the selected viewing direction is displayed on display area 20 and the remaining data which corresponds approximately to the remaining 180 degrees is displayed on display area 24 as a reverse or mirror image. For example, in reference to FIGS. 4 and 6, if the user selects a direction of view as shown by arrow 98 of FIG. 4, the center of the selected view corresponds to column 112. The data corresponding to column 112 was stored in column 118 of the display memory. If we assume there are a total of n columns of data in the display memory of FIG. 5 and that the n columns correspond to 360 degrees of image data, display area 20 will receive n/2 columns of data and display area 24 will receive the remaining n/2 columns of data. The data displayed on area 20 from left to right is read out of the memory beginning at column 118−n/4 and continues in the direction of arrow 128 to column 118+n/4. The image data provided to display area 24 from left to right corresponds to the data extending from column 118−n/4 and continues in the direction of arrows 130 and then 132 to column 118+n/4. It should be noted that the columns of FIG. 5 are addressed in a circular manner so that when reference line 100L or 100R is reached, the addressing restarts at the other end of the display memory.

The invention claimed is:

1. A method for displaying a panoramic image, comprising the steps of:

displaying a first portion of the panoramic image on a first section of a display area, the first portion corresponding to a selected viewing direction; and displaying a second portion of the panoramic image as a mirror image of the second portion of the panoramic image on a second section of a display area, the second portion corresponding to a direction substantially opposite to the selected viewing direction.

2. The method of claim 1, wherein the first portion of the panoramic image is displayed above the second portion of the panoramic image.

3. The method of claim 2, wherein a substantially elliptical icon is displayed between the first and second portions of the panoramic images.

4. The method of claim 3, wherein a portion of the substantially elliptical icon closest to the first portion of the panoramic image has a different appearance than a portion of the substantially elliptical icon closest to the second portion of the panoramic image.

5. The method of claim 4, wherein the different appearance is a difference in color.

6. The method of claim 4, wherein the different appearance is a difference in shading.

7. The method of claim 4, wherein the different appearance is a difference in cross hatching.

8. The method of claim 1, wherein the second portion of the panoramic image is displayed above the first portion of the panoramic image.

9. The method of claim 8, wherein a substantially elliptical icon is displayed between the first and second portions of the panoramic images.

10. The method of claim 9, wherein a portion of the substantially elliptical icon closest to the first portion of the panoramic image has a different appearance than a portion of the substantially elliptical icon closest to the second portion of the panoramic image.

11. The method of claim 10, wherein the different appearance is a difference in color.

12. The method of claim 10, wherein the different appearance is a difference in shading.

13. The method of claim 10, wherein the different appearance is a difference in cross hatching.

* * * * *